US 8,296,528 B2

(12) United States Patent
Zimmer et al.

(10) Patent No.: US 8,296,528 B2
(45) Date of Patent: Oct. 23, 2012

(54) METHODS AND SYSTEMS FOR MICROCODE PATCHING

(75) Inventors: Vincent J. Zimmer, Federal Way, WA (US); Scott H. Robinson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 963 days.

(21) Appl. No.: 12/264,062

(22) Filed: Nov. 3, 2008

(65) Prior Publication Data

US 2010/0115202 A1    May 6, 2010

(51) Int. Cl.
*G06F 12/08*    (2006.01)
*G06F 12/14*    (2006.01)
*G06F 9/24*    (2006.01)

(52) U.S. Cl. ............. 711/152; 711/129; 711/163; 713/1; 726/27

(58) Field of Classification Search .......................... None
See application file for complete search history.

(56) References Cited

U.S. PATENT DOCUMENTS

| 6,141,740 | A  | * | 10/2000 | Mahalingaiah et al. ....... 711/215 |
| 7,139,909 | B2 | * | 11/2006 | Lee ................................. 713/100 |
| 7,290,081 | B2 | * | 10/2007 | Parthasarathy et al. ....... 711/102 |
| 7,734,873 | B2 | * | 6/2010  | Lauterbach et al. .......... 711/129 |

OTHER PUBLICATIONS

Zimmer, Vincent J., et al., "BIOS Routine Avoidance", U.S. Appl. No. 11/949,317, filed Dec. 3, 2007.

* cited by examiner

*Primary Examiner* — Gary Portka
(74) *Attorney, Agent, or Firm* — Blakely, Sokoloff, Taylor & Zafman LLP

(57) ABSTRACT

Methods and systems for performing microcode patching are presented. In one embodiment, a data processing system comprises a cache memory and a processor. The cache memory comprises a plurality of cache sections. The processor sequesters one or more cache sections of the cache memory and stores processor microcode therein. In one embodiment, the processor executes the microcode in the one or more cache sections.

20 Claims, 7 Drawing Sheets

METHODS AND SYSTEMS FOR MICROCODE PATCHING

FIELD OF THE INVENTION

Embodiments of the invention relate to performing a microcode patch for a computer processor.

BACKGROUND OF THE INVENTION

Firmware updates for a processor, more specifically known as microcode patches, are created for various purposes such as, for example, error correction, feature enhancement, and security updates. It would be unwieldy to require end users to replace a computer processor if only a minor bug is found in the processor. Likewise, it is too costly to replace processors whenever minor compatibility issues occur or new enhancements are introduced into the marketplace. Patching processor microcode is usually a feasible solution for the situations aforementioned.

The initialization and configuration of a computer system by firmware, such as Basic Input/Output System (BIOS), occur during a preboot phase. After power-on reset, a processor refers to a predetermined address which is mapped to a computer chip storing BIOS firmware. The processor sequentially fetches BIOS instructions. These instructions typically cause the computer to (i) initialize its electronic hardware; (ii) initialize its peripheral devices; and (iii) boot an operating system. Unified Extensible Firmware Interface (UEFI) is a modern BIOS firmware architecture comprising several phases such as: security phase (SEC), platform Environment Initialization (PEI) phase, driver execution environment (DXE) phase, and boot device select (BDS) phase.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Embodiments of methods and systems for performing microcode patching are presented. In one embodiment, a data processing system comprises a cache memory and a processor. The cache memory comprises a plurality of cache sections. The processor sequesters one or more cache sections of the cache memory and stores processor microcode therein. In one embodiment, the processor executes the microcode in the cache section.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Figure 1A:
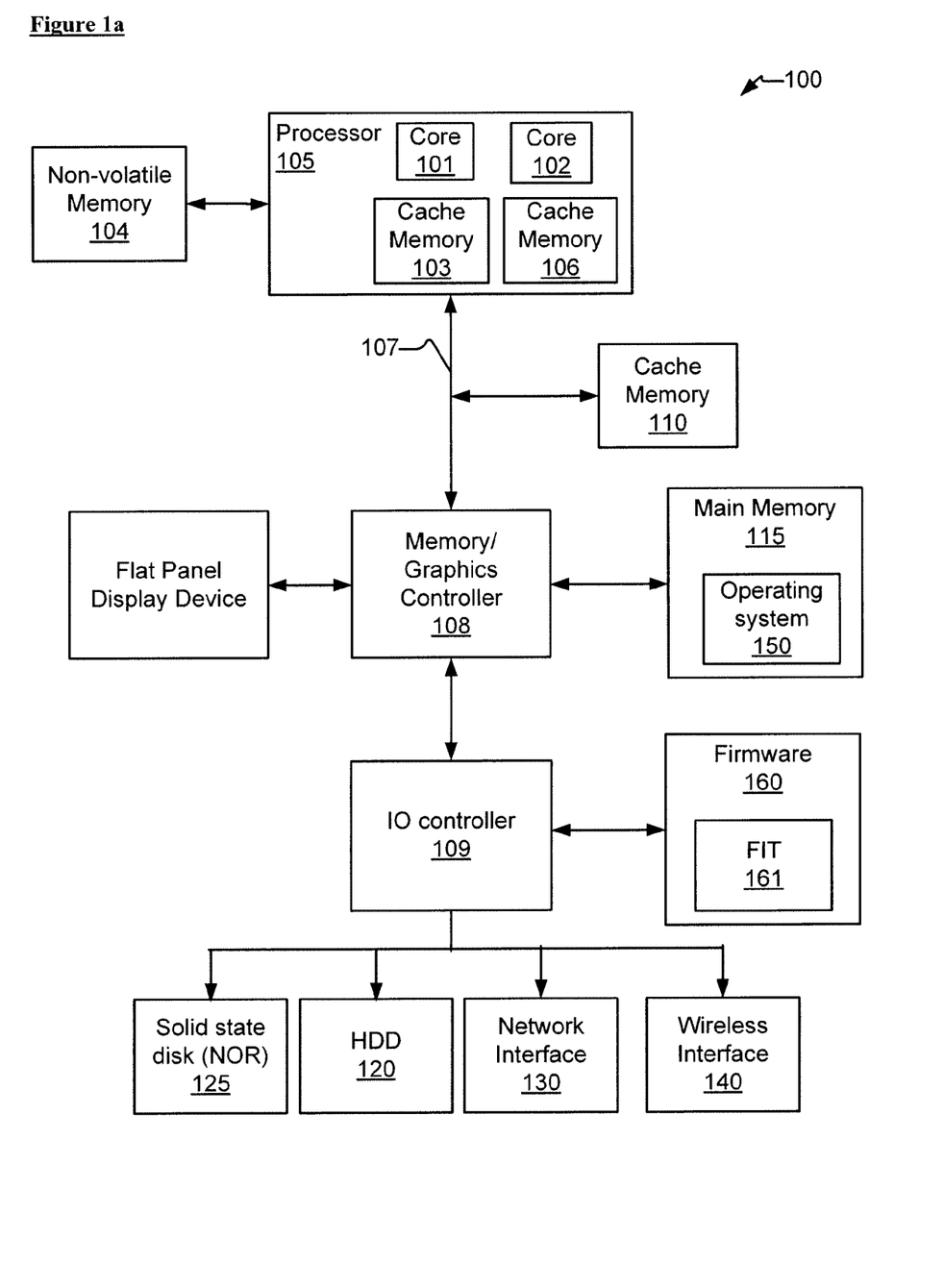
FIG. 1a is a block diagram illustrating a computer system in accordance with one embodiment of the present invention.

FIG. 1a is a block diagram illustrating a computer system in accordance with one embodiment of the present invention. In one embodiment, the computer system includes processor 105, non-volatile memory 104, memory/graphics controller 108, I/O controller 109, main memory 115, and firmware device 160. In one embodiment, processor 105 accesses data from level 1 (L1) cache memory 106, level 2 (L2) cache memory 110, and main memory 115. In one embodiment, processor 105 is coupled to memory/graphics controller 108. Memory/graphics controller 108 is coupled to I/O controller 109, which in turn, coupled to firmware device 160, solid state disk 125, hard disk drive 120, network interface 130, and wireless interface 140. In one embodiment, main memory 115 loads operating system 150.

In one embodiment, processor 105 comprises core 101, core 102, cache memory 103, and cache memory 106. In one embodiment, cache memory 103 is a private cache of core 101, whereas cache memory 106 is a private cache of core 102.

In one embodiment, processor 105 is coupled to non-volatile memory 104. In one embodiment, processor 105 and non-volatile memory 104 are on a same die or on a same substrate. In one embodiment, non-volatile memory 104 is an on-die flash memory device for processor 105. In one embodiment, non-volatile memory 104 is coupled to I/O controller 109.

In one embodiment, main memory 115 may be implemented in various memory sources, such as dynamic random-access memory (DRAM), hard disk drive (HDD) 120, solid state disk 125 based on NVRAM technology, or a memory source located remotely from a computer system via network interface 130 or via wireless interface 140 containing various storage devices and technologies. The cache memory may be located either within the processor or in close proximity to the processor, such as on the processor's local bus 107.

In one embodiment, firmware device 160 is a system read only memory (ROM) provided by third party vendors or a non-volatile memory device. In one embodiment, processor 105 is coupled to firmware device 160. In one embodiment, firmware device 160 is located in a same package as processor 105. In other embodiments, firmware device 160 is external to a processor package.

In one embodiment, firmware device 160 contains Basic Input/Output System (BIOS) of the computer system and one or more processor microcode patches. The BIOS includes additional segments of code (i.e. routines) that perform system setup during a boot process. In one embodiment, firmware device 160 further includes firmware interface table (FIT 161). In one embodiment, processor 105 refers to an FIT pointer for the location of FIT 161.

In one embodiment, FIT 161 stores addresses of processor microcode patches and firmware modules for other devices. In one embodiment, FIT 161 includes pointers to locations elsewhere within firmware device 160 where segments of code (i.e. other routines) are located. In one embodiment, firmware device 160 also stores third party macrocode. FIT 161 will be described in further detail below with additional references to the remaining figures.

In one embodiment, non-volatile memory 104 contains one or more processor microcode patches. In one embodiment, processor 105 reads from non-volatile memory 104 to retrieve a processor microcode patch without referring to FIT 161. In one embodiment, non-volatile memory 104 is exclusively accessible by processor 105. In one embodiment, cores 101-102 read a same processor microcode patch stored in non-volatile memory 104.

In one embodiment, I/O controller 109 includes one or more I/O host controllers that control one or more I/O interconnects (not shown). In one embodiment, I/O controller 109 is coupled to processor 109 with a single link (i.e., interconnect or bus). In one embodiment, this coupling may be accomplished over a series of links. In one embodiment, processor 105 is coupled over a first link (e.g., local bus 107) to memory/graphics controller 108 (where the memory complex interfaces with a memory subsystem), and memory/graphics controller 108 is coupled to I/O controller 109 over a second link. In one embodiment, I/O interconnects are a combination of point-to-point interconnects and buses.

In many embodiments, at least one processor 105 is present. In one embodiment, multiple processor cores are present in the system (cores 101-102). In one embodiment, multiple processors, each with single or multi-cores are present in the system (not shown). In embodiments where there are multiple cores and/or multiple processors in the system, a single master core is designated to perform boot and other such system handling processes in the system.

In one embodiment, processor 105, cache memory 106, memory/graphics controller 108, and I/O controller 109 are in a same package. In one embodiment, processor 105, cache memory 106, memory/graphics controller 108, and I/O controller 109 are on a same substrate. In one embodiment, processor 105, cache memory 106, and non-volatile memory 104 are on a same substrate or in a same package. In one embodiment, processor 105, cache memory 106, memory/graphics controller 108, non-volatile memory 104, and I/O controller 109 are on a same substrate or in a same package.

Other embodiments of the invention, however, may exist in other circuits, logic units, or devices in conjunction with the system of FIG. 1. Furthermore, other embodiments of the invention may be distributed throughout several circuits, logic units, or devices illustrated in FIG. 1.

Figure 1B:
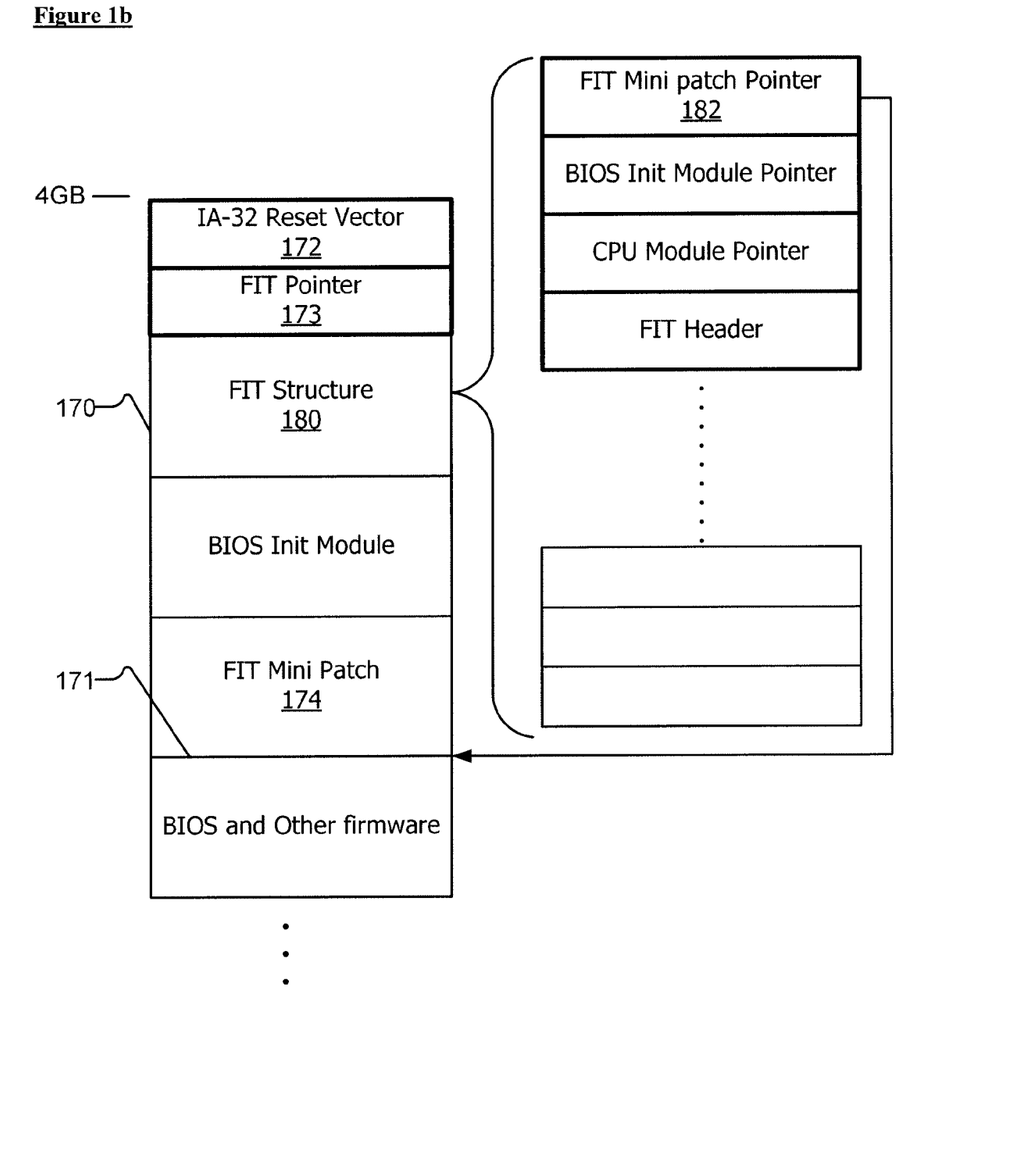
FIG. 1b shows one embodiment of a part of a memory map for a computer system.

FIG. 1b shows one embodiment of a memory map for a computer system. In one embodiment, the memory region below 4 Gbyte is mapped to a system read only memory (ROM), a flash device, or other non-volatile memory to store firmware 170. In one embodiment, the memory region is a 16 Mbytes region at the top of 32-bit memory space (i.e., 4 Gbyte). In one embodiment, the very top of memory space (memory address—10h) contains reset vector 172 (e.g., Intel® Architecture 32-bit reset vector) for legacy compatibility. In one embodiment, reset vector 172 is a pointer to the address of the first module to be executed by a processor after system reset.

In one embodiment, FIT pointer 173 is located below reset vector 172. FIT pointer 173 points to the location of FIT structure 180 located elsewhere within firmware 170. Both reset vector 172 and FIT pointer 173 are located in the protected boot block in firmware 170. In one embodiment, the location of FIT pointer 173 is predetermined but FIT structure 180 can be stored at other memory locations below the protected boot block.

In one embodiment, FIT structure 180 includes pointers, such as, for example, FIT mini patch pointer 182, a BIOS Init Module pointer, a CPU module pointer, and an FIT header. It will be appreciated by those skilled in the art that these pointers are programmed or set based on system configurations and can be added and removed according to different system configurations.

In one embodiment, FIT mini patch pointer 182 is a pointer to address 171 indicating the location of FIT mini patch 172.

In one embodiment, FIT mini patch 172 includes processor microcode. In one embodiment, processor microcode includes one or more code segments related to functions, such as, for example, to perform clock compensation, to optimize timing, to relax speed paths, or to enable new features of a processor or a computer system. In one embodiment, processor microcode enhances features of processor 105, memory/graphics controller 108, I/O controller 109, or any combination thereof from a platform perspective. In one embodiment, the size of processor microcode ranges from 8 Kbytes to several Mbytes.

In one embodiment, processor microcode is encrypted for security purposes. In one embodiment, processor microcode is protected with cryptographic hash functions, such as, for example, Message-Digest algorithm 5 (MD5), secure hash algorithm 1 (SHA1), SHA-256, and SHA-512. In one embodiment, processor microcode is encrypted and is digitally signed (e.g., RSA and Elliptic curve cryptography-based algorithms).

Figure 2:
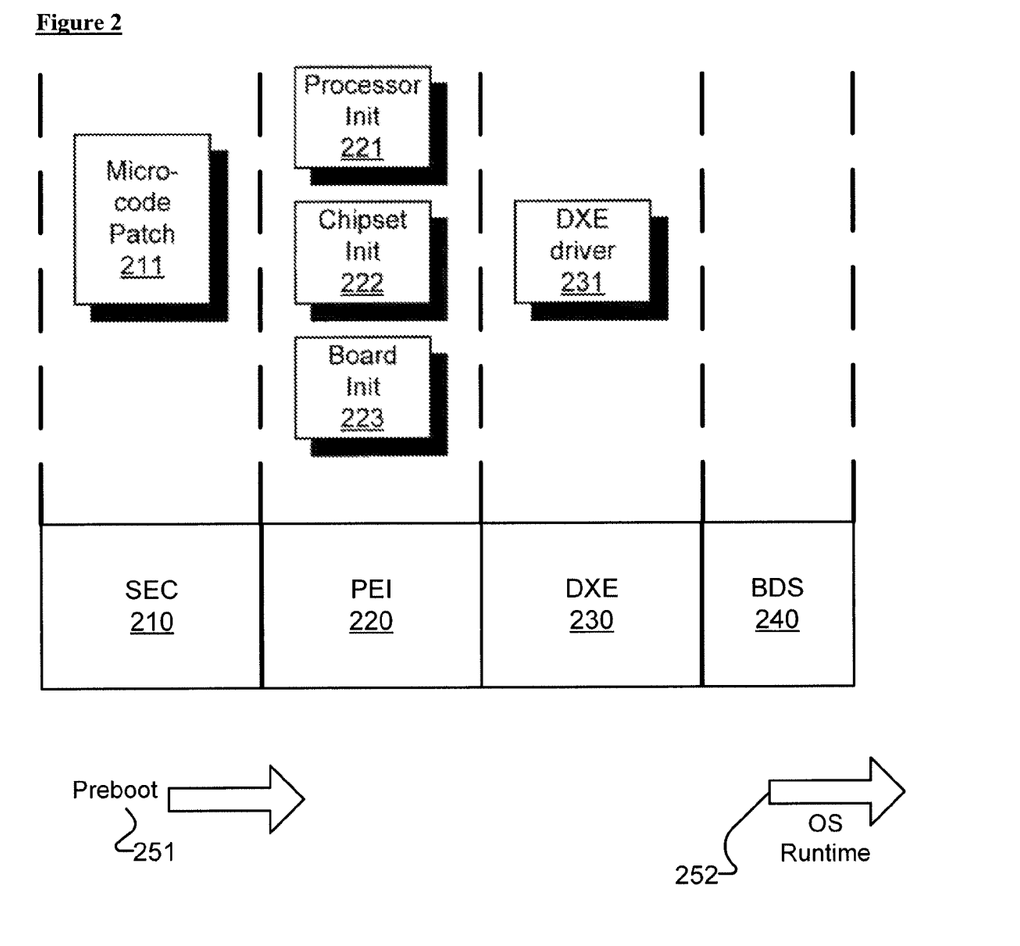
FIG. 2 is a block diagram showing phases of Unified Extensible Firmware Interface (UEFI) in accordance with one embodiment of the invention.

FIG. 2 is a block diagram showing phases of a Unified Extensible Firmware Interface (UEFI) implementation in accordance with one embodiment of the invention. The phases include a security (SEC) phase 210, pre-EFI initialization (PEI) phase 220, driver execution environment (DXE) phase 230, and boot device selection (BDS) phase 240. Other phases of UEFI (not shown) include a transient system load (TSL) phase, an operating system run-time (RT) phase, and an after-life (AL) phase. The phases build upon one another to provide an runtime environment for the operating system (OS) and the platform.

In one embodiment, preboot 251 includes SEC phase 210, PEI phase 220, and DXE phase 230. In one embodiment, OS runtime 252 begins after BDS phase 240.

In one embodiment, processor microcode 211 is loaded after power on reset during SEC phase 210. In one embodiment, after completing the execution of processor microcode 211, the program control returns to PEI phase 220 to continue executing other firmware modules. In one embodiment, processor microcode 211 is loaded or begins to execute before other firmware modules because processor microcode 211 contains error correction or features that are required by other follow on firmware modules. For example, BIOS may perform a memory test operation with a processor instruction that requires correction from processor microcode 211 so that the operation executes correctly.

In one embodiment, SEC phase 210 also supports security checks of the initial op-code to be executed on the computer system. SEC phase 210 includes a power-on sequence of the computer system and authenticates the PEI Foundation before the PEI Foundation is allowed to execute during the next phase.

In one embodiment, PEI phase 220 provides a standardized method of loading and invoking initial (INIT) configuration routines for a processor, a chipset, and a motherboard (processor INIT 221, chipset INIT 222, and board INIT 223). PEI phase 220 is responsible for initializing enough of the system to provide a stable base for the follow on phases. Initialization of the platform's core components, including the processor, the chipset, and the motherboard is performed during PEI phase 220.

In one embodiment, at the beginning of PEI phase 220, the system memory is not yet initialized. Once system memory is initialized during PEI phase 220, the firmware modules are loaded into system memory for execution. The PEI logic may also ascertain the boot mode of a computer system. Embodiments of a boot mode include a normal preboot, awakening from a sleep state, such as an S3 state, in accordance with Advanced Configuration and Power Interface (ACPI) specification (see, Advanced Configuration and Power Interface Specification, revision 3.0b, Oct. 10, 2006), and Recovery mode for reconstituting corrupted firmware.

In one embodiment, PEI phase 220 discovers memory and prepares a resource map that is handed off to DXE phase 230. The state of the system at the end of PEI phase 220 is passed to DXE phase 230 through a list of data structures called Hand Off Blocks (HOBs).

In one embodiment, DXE phase 230 is the phase during which most of the system initialization is performed. DXE phase 230 is facilitated by several components, including DXE Core, DXE Dispatcher, and a set of DXE drivers 231. The DXE Core produces a set of Boot/Runtime Services and DXE services. DXE Dispatcher is responsible for discovering and executing DXE drivers 231 in the correct order. DXE drivers 231 are responsible for initializing platform components as well as providing software abstractions of the platform. These components work together to initialize the platform and to provide services that are required to boot an operating system. In one embodiment, BDS phase 240 further prepares the computer system to load an operating system.

Figure 3:
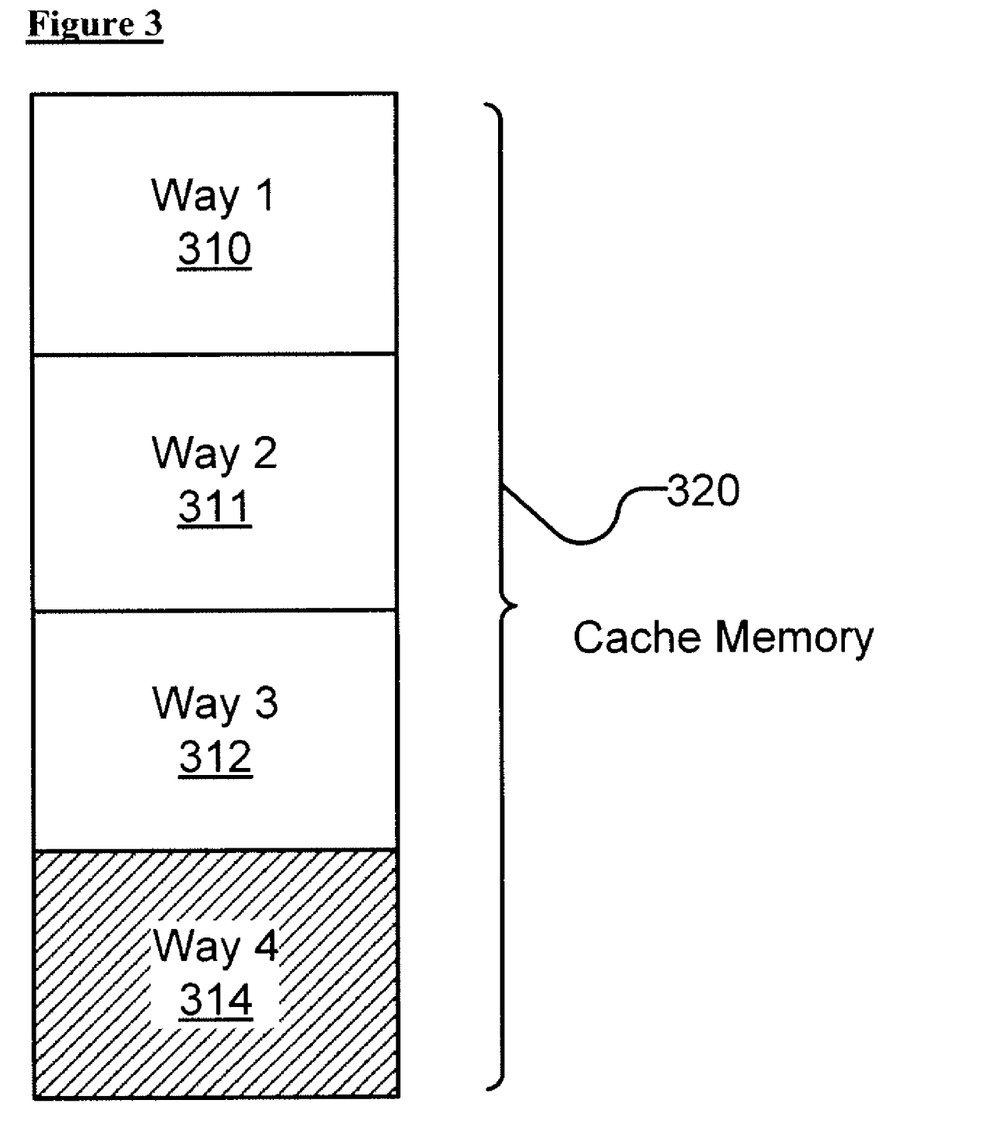
FIG. 3 shows an embodiment of a cache memory.

FIG. 3 shows an embodiment of a cache memory. Referring to FIG. 3, in one embodiment, cache memory 320 is a multi-way cache memory. In one embodiment, cache memory 320 comprises multiple physical sections. In one embodiment, cache memory 320 is logically divided into multiple sections. In one embodiment, cache memory 320 includes four cache ways, i.e., cache way 310, cache way 311, cache way 312, and cache way 314. In one embodiment, a processor sequesters one or more cache ways to store or to execute processor microcode. A cache way that is sequestered is protected from access by other programs being executed concurrently. In one embodiment, cache memory 320 is programmed to operate in non-eviction mode (NEM) by setting configuration registers of a processor. In one embodiment, a cache way that is sequestered is protected from direct memory access (DMA) from I/O devices or interconnects.

In one embodiment, a cache way is reserved to store processor microcode. In one embodiment, a cache way provides memory resource required for the execution of processor microcode. In one embodiment, processor microcode is able to execute-in-place. In one embodiment, processor microcode creates data structures such as heaps, queues, stacks, or any combinations thereof when executing the processor microcode.

Figure 4:
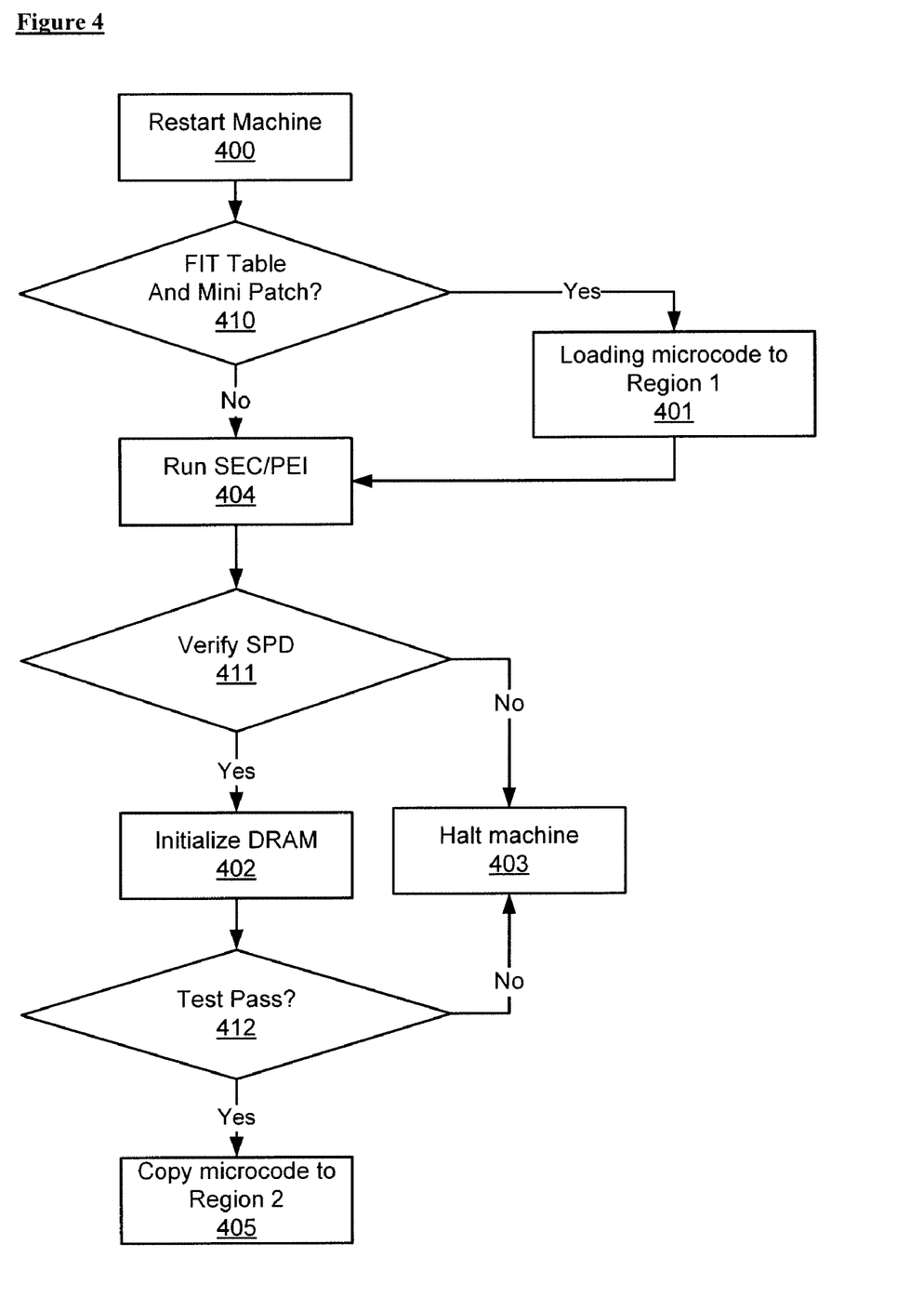
FIG. 4 is a flow diagram of one embodiment of a process to perform microcode patching.

FIG. 4 is a flow diagram of one embodiment of a process to perform microcode patching. The process is performed by processing logic that may comprise hardware (circuitry, dedicated logic, etc.), software (such as one that is run on a general purpose computer system or a dedicated machine), or a combination of both. In one embodiment, processing logic operates in response to processor microcode.

Referring to FIG. 4, in one embodiment, the process begins when a computer starts to boot or receives a power reset event (process block 400). Processing logic determines whether a FIT table exists and processor microcode exists as indicated in the FIT table (process block 410). In one embodiment, one or more processor microcode patches are stored and the first processor microcode patch is known as a Mini patch.

In one embodiment, if processor microcode does not exist, processing logic performs operations as usual during the SEC phase and the PEI phase (process block 404). In one embodiment, processing logic initializes the main memory.

In one embodiment, if processor microcode is found, processing logic loads the processor microcode into a sequestered cache way (memory region 1) (process block 401). In one embodiment, processing logic sequesters the cache way when the cache memory is not yet made accessible to any other third party firmware.

In one embodiment, processing logic continues to load additional processor microcode patches if exist. In one embodiment, processing logic determines whether processor microcode is authenticated. In one embodiment, processing logic authenticates processor microcode patches by using digital signature techniques. In one embodiment, processing logic decrypts processor microcode before storing the decrypted code in the sequestered cache way. In one embodiment, processing logic stores processor microcode in the sequestered cache way and decrypts, authenticates, and executes the processor microcode in the sequestered cache way.

In one embodiment, a sequestered cache way is from a local cache memory (private cache) of each individual core of a multi-core processor. In one embodiment, the sequestered cache way is from a shared cache memory of a multi-core processor.

In one embodiment, the cache memory is set to non-eviction mode (NEM) while it is sequestered. In one embodiment, processing logic sequesters a cache way by setting the value of a cache control register (CCR). As mentioned above, the memory in the cache way may be used for storing processor microcode as well as for executing processor microcode. In one embodiment, a part of processor microcode is able to execute with only the system ROM and processor registers.

In one embodiment, processing logic registers for an event notification managed by a memory controller so that processing logic receives a signal when the main memory is initialized. In one embodiment, before a main memory (e.g., DRAM) is initialized, a memory-execution-unit (MEU) of a processor does not require any cache resource (cache lines or cache ways) to increase memory throughput performance.

In one embodiment, processing logic continues to perform operations in the SEC phase and the PEI phase (process block 404).

In one embodiment, BIOS firmware modules, which are compiled from a high-level programming language, use other memory resources in addition to processor registers. A cache memory is temporally initialized to act as RAM (Random Access Memory), thus, enabling stacks or heaps to be stored in the cache memory. This provides the possibility for BIOS firmware modules to use software memory structures (e.g., queues, stacks, heaps, etc.) during the PEI phase and uses a cache memory in a Cache-As-RAM (CAR) mode. In one embodiment, a cache way that is sequestered for processor microcode is not available for or is protected from BIOS firmware modules. In one embodiment, BIOS uses un-sequestered portions of the cache memory as CAR.

In one embodiment, processing logic determines that a main memory exists by verifying the result of serial presence detection (SPD) (process block 411). If the verification fails, processing logic halts the computer (process block 403). Otherwise, if the verification succeeds, processing logic initializes the main memory (e.g., DRAM) during process block 402. If the initialization (e.g., memory test in process block 412) fails, processing logic halts the computer (process block 403).

In one embodiment, if the initialization of the main memory succeeds, processing logic sequesters a memory region (memory region 2) in the main memory. Processing logic copies processor microcode from the sequestered cache way to the sequestered memory region in the main memory (process block 405). In one embodiment, processing logic operates in response to processor microcode. In such cases, processor microcode contains code that copies the processor microcode itself to the main memory.

In one embodiment, the sequestered memory region is protected from access of other programs. In one embodiment, the sequestered memory region is protected from direct memory access (DMA) from I/O devices or interconnects. In one embodiment, the sequestered memory region remains exclusively reserved for processor microcode during the normal operation of a computer (e.g., after the operating system begins).

In one embodiment, when BIOS initializes the main memory, BIOS determines the boundary of the main memory (e.g., below 4 Gbyte). Processing logic executes memory reference code (MRC) to enable DDR3 DRAM. Processing logic programs TOLUD (Top of Lower Usable DRAM) register to indicate top of DRAM memory available below the location of 4 GByte. In one embodiment, processing logic sequesters a memory region, for at least the size of the sequestered cache way, below the location indicated by TOLUD register. In one embodiment, when TOLUD register is set, processing logic receives a signal or indication to reserve a sequestered memory region and copy processor microcode to the sequestered memory region. In one embodiment, after copying, processing logic erases or overwrites contents of the sequestered cache way to prevent unauthorized access of the contents.

In one embodiment, processing logic programs Range registers (e.g., memory type range register) to protect the sequestered memory region from access by other non-authorized modules or unauthorized direct memory access via I/O interconnects. In one embodiment, processing logic sets the protection of the sequestered memory region during a memory initialization process. In one embodiment, a sequestered memory region is a part of a main memory (e.g., DRAM).

In one embodiment, the sequestered memory region is for storing processor microcode, executing processor microcode, or both. In one embodiment, some of the addresses in processor microcode have to be translated with reference to the address of sequestered memory region during the migration from the sequestered cache way to the sequestered memory region.

In one embodiment, contents of the sequestered memory region are encrypted. In one embodiment, processing logic decrypts contents that are read from the sequestered memory region. In one embodiment, processing logic encrypts contents before writing the contents to the sequestered memory region.

In one embodiment, processing logic sets a cache way to normal mode and returns the cache memory resource to normal execution. In one embodiment, processing logic sets the cache-control-register (CCR) to return the sequestered cache way so that the cache way is available for MEU of the processor. In one embodiment, a cache way is available to MEU by enabling TOLUD register or by disabling NEM.

In one embodiment, processing logic determines which memory region to use based on whether of TOLUD register is enabled or whether a cache memory is in NEM mode. Processing logic loads processor microcode to a sequestered cache memory if the cache memory is in NEM mode or if TOLUD register is disabled. Processing logic loads processor microcode to a sequestered memory region in a main memory if cache memory is not in NEM mode or if TOLUD register is enabled.

Figure 5:
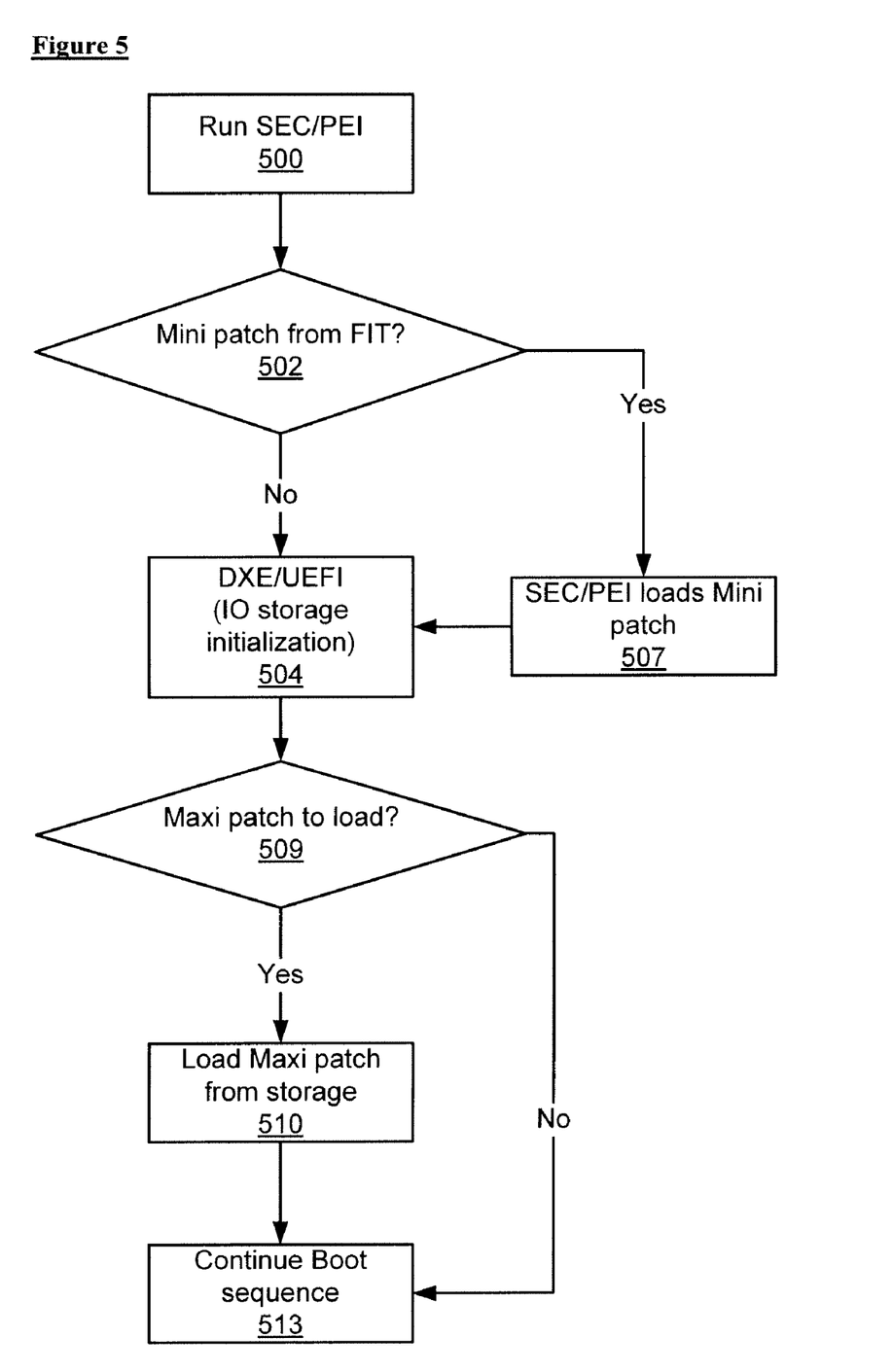
FIG. 5 is a flow diagram of one embodiment of a process to perform microcode patching for two microcode patches.

FIG. 5 is a flow diagram of one embodiment of a process to perform microcode patching for two processor microcode patches. The process is performed by processing logic that may comprise hardware (circuitry, dedicated logic, etc.), software (such as one that is run on a general purpose computer system or a dedicated machine), or a combination of both. In one embodiment, processing logic operates in response to the routines in processor microcode.

Referring to FIG. 5, in one embodiment, the process begins by processing logic enters the SEC phase or the PEI phase (process block 500). Processing logic determines whether a FIT table exists and processor microcode exists as indicated in the FIT table (process block 502).

In one embodiment, if processor microcode does not exist, processing logic performs operations as usual during DXE phase to initialize I/O devices (process block 504). In one embodiment, if processor microcode exists, processing logic loads the processor microcode into a sequestered cache way (or a memory region exclusive to processing logic) (process block 507). The first processor microcode patch is known as Mini patch. Processing logics proceeds to DXE phase (process block 504). In one embodiment, processing logic continues to load additional processor microcode patches, if exists, from a system ROM.

During DXE phase, I/O devices including storage devices (e.g., solid state disk, hard disk drive, and network storage devices) become accessible. In one embodiment, the storage devices are coupled to the processor via buses, such as, but not limited to, PCI-E, SATA, USB, and EIDE. In one embodiment, processing logic determines whether process microcode exists on any of the storage devices. In one embodiment, such processor microcode is known as Maxi patch.

In one embodiment, Mini patch loads system-related data (e.g., parameter for maximum voltages, routing of system management bus, etc.) stored in a FIT to support initialization of system memory.

In one embodiment, processor microcode in the Mini patch provides an indication to the location of the Maxi patch. In one embodiment, the Maxi patch includes processor microcode in the Mini patch and other additional microcode. Processing logic loads Maxi patch from storage devices to a memory region in a main memory. The memory region has been sequestered after the main memory is initialized during the PEI phase (process block 510). Processing logic stores or executes processor microcode in the sequestered memory region.

In one embodiment, processing logic executes other follow on boot script (process block 513).

In one embodiment, the size of Maxi patch ranges from 256 Kbyte to several Mbyte. In one embodiment, Maxi patch is larger than Mini patch. In one embodiment, Maxi patch is stored in the UEFI system partition of a hard disk drive (main storage). In one embodiment, Maxi patch is stored in a non-volatile storage device, an integrated flash memory, or a flash memory in a same package or on a same die with a processor. In one embodiment, Maxi patch is stored in a non-volatile storage device accessible via a pre-OS UEFI in-band network or via an out-of-band (OOB) network.

In one embodiment, the size of a system ROM is smaller than 4 Mbyte. The memory space of the system ROM may not be large enough to store the entire Maxi patch because other BIOS firmware routines are stored in the same system ROM too. In one embodiment, a larger patch enables processor microcode to provide more features or to support more capabilities.

In one embodiment, processing logic programs Range registers (e.g., memory type range register) to protect the sequestered memory region from access by other non-authorized modules or unauthorized direct memory access via I/O inter-connects. In one embodiment, processing logic sets the protection of the sequestered memory region during a memory initialization process.

Figure 6:
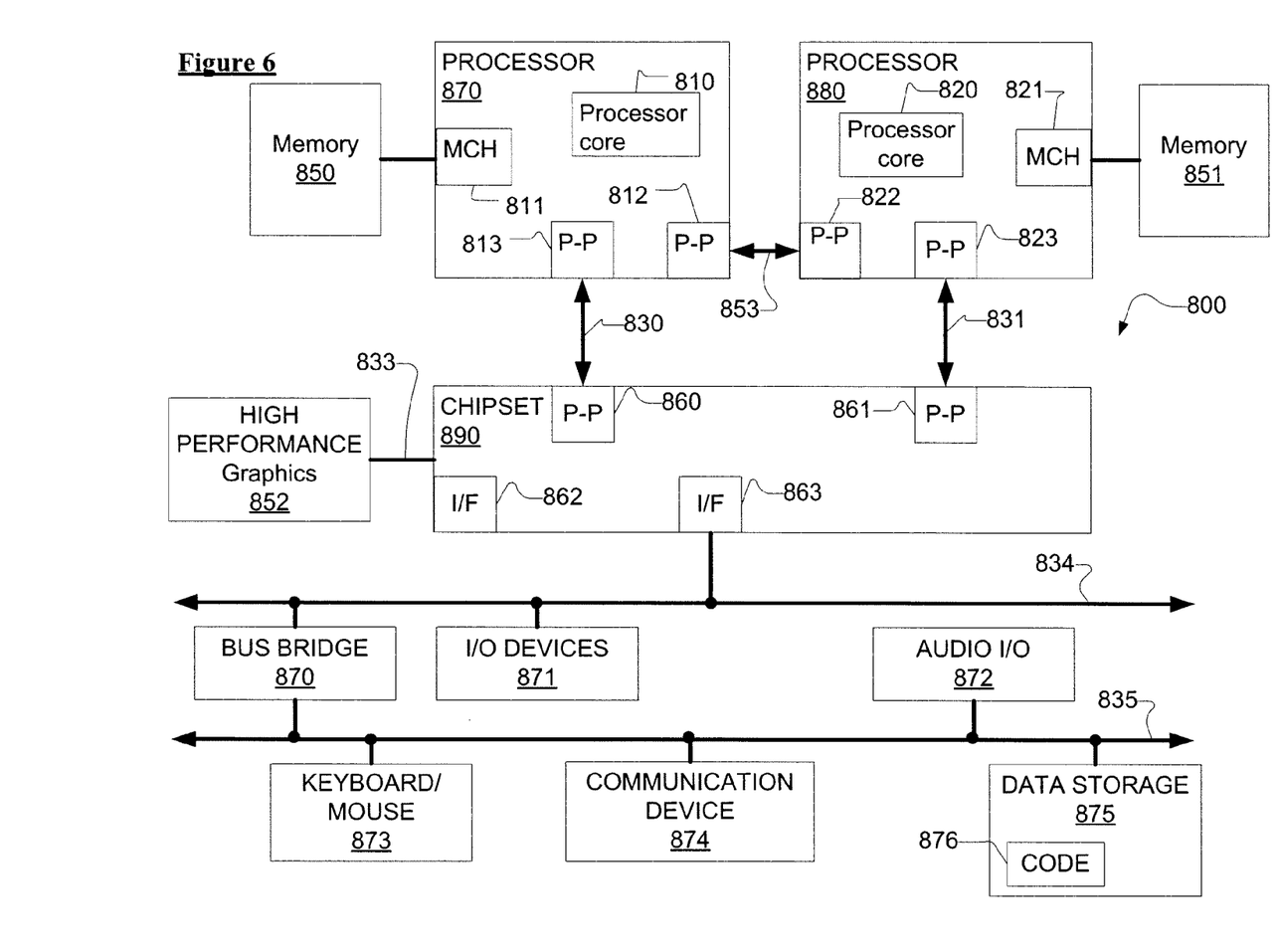
FIG. 6 illustrates a point-to-point computer system for use with one embodiment of the invention.

FIG. 6 illustrates a point-to-point computer system for use with one embodiment of the invention.

FIG. 6, for example, illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:
1. A data processing system comprising:
a cache memory including a plurality of cache sections;
a processor to temporarily sequester a first one or more cache sections of the cache memory and store at least a part of a version of a first processor microcode patch in the temporarily sequestered first one or more cache sections before firmware of the data processing system accesses the first one or more cache sections of the cache memory during a boot sequence;
the processor operable to sequester a memory region in a main memory after initialization of the main memory during the boot sequence and copy the at least a part of a version of the first processor microcode patch to the sequestered memory region; and the processor operable to return the temporarily sequestered first one or more cache sections of the cache memory for use after the copying.

2. The system of claim 1, further comprising a first non-volatile memory region to store the first processor microcode patch and a second non-volatile memory region to store an address of the first non-volatile memory region.

3. The system of claim 2, wherein the first non-volatile memory region and the second non-volatile memory region are of the same non-volatile memory coupled to the processor.

4. The system of claim 1, wherein the first one or more cache sections are protected from access by other programs if the first one or more cache sections are temporarily sequestered by the processor before the firmware uses the cache memory during a security phase of the boot sequence.

5. The system of claim 1, wherein the processor is operable to access a second processor microcode patch in response to execution of the first processor microcode patch.

6. The system of claim 5, wherein the second processor microcode patch comprises a combination of the first processor microcode patch and other microcode.

7. The system of claim 1, wherein the processor is operable to execute the first processor microcode patch on the first one or more cache sections, wherein the cache memory is a first level cache of the processor.

8. A computer-implemented method comprising:
temporarily sequestering a first one or more cache sections of a cache memory;
storing at least a part of a version of a first processor microcode patch in the temporarily sequestered first one or more cache sections before firmware of the computer accesses the first one or more cache sections of the cache memory during a boot sequence; and
sequestering a memory region in a main memory after initialization of the main memory during the boot sequence and copying the at least a part of a version of the first processor microcode patch to the sequestered memory region.

9. The method of claim 8, further comprising receiving an address of a first non-volatile memory region storing the first processor microcode patch, wherein the address of the first non-volatile memory region is stored in a second non-volatile memory region.

10. The method of claim 8, wherein the temporarily sequestering the first one or more cache sections comprises protecting the first one or more cache sections from access by other programs.

11. The method of claim 8, further comprising accessing at least part of a version of a second processor microcode patch in response to execution of the first processor microcode patch.

12. The method of claim 11, wherein the second processor microcode patch comprises a combination of the first processor microcode patch and other microcode.

13. The method of claim 8, further comprising executing the first processor microcode patch on the first one or more cache sections, wherein the cache memory is a first level cache of a processor.

14. The method of claim 8, further comprising:
releasing the temporarily sequestered first one or more cache sections after copying the at least a part of a version of the first processor microcode patch to the sequestered memory region; and
erasing the contents of the first one or more cache sections.

15. An article of manufacture comprising a computer readable storage medium including data storing instructions thereon that, when accessed by a machine, cause the machine to perform a method comprising:
temporarily sequestering a first one or more cache sections of a cache memory;
storing at least a part of a version of a first processor microcode patch in the temporarily sequestered first one or more cache sections before firmware of the computer accesses the first one or more cache sections of the cache memory during a boot sequence; and
sequestering a memory region in a main memory after initialization of the main memory during the boot sequence and copying the at least a part of a version of the first processor microcode patch to the sequestered memory region.

16. The article of manufacture of claim 15, wherein the method further comprising receiving an address of a first non-volatile memory region storing the first processor microcode patch, wherein the address of the first non-volatile memory region is stored in a second non-volatile memory region.

17. The article of manufacture of claim 15, wherein the temporarily sequestering the first one or more cache sections comprises protecting the first one or more cache sections from access by other programs.

18. The article of manufacture of claim 15, wherein the method further comprising accessing at least part of a version of second processor microcode patch in response to execution of the first processor microcode patch.

19. The article of manufacture of claim 18, wherein the second processor microcode patch comprises a combination of the first processor microcode patch and other microcode.

20. The article of manufacture of claim 15, further comprising executing the first processor microcode patch on the first one or more cache sections, wherein the first cache memory is a first level cache of a processor.

* * * * *